(12) United States Patent
Brandreth, III

(10) Patent No.: US 6,280,617 B1
(45) Date of Patent: Aug. 28, 2001

(54) CHEMICAL DISPENSER

(76) Inventor: John B. Brandreth, III, P.O. Drawer 1068, 158 Railroad St., Canton, GA (US) 30114

( * ) Notice: Subject to any disclaimer, the term of this patent is extended or adjusted under 35 U.S.C. 154(b) by 0 days.

(21) Appl. No.: 09/458,865

(22) Filed: Dec. 10, 1999

(51) Int. Cl.[7] .................................................... B01D 11/02
(52) U.S. Cl. ........................ 210/206; 210/443; 422/264; 422/277; 137/268
(58) Field of Search ................................. 210/169, 205, 210/206, 256, 416.2, 440, 493.5, 443; 422/261, 264, 276, 277; 137/268

(56) References Cited

U.S. PATENT DOCUMENTS

| | | |
|---|---|---|
| 2,891,622 | 6/1959 | Patterson et al. . |
| 3,195,558 | 7/1965 | Klueber et al. . |
| 3,579,440 | 5/1971 | Bradley, Jr. . |
| 3,612,080 | 10/1971 | Schneider et al. . |
| 4,347,224 | 8/1982 | Beckert et al. . |
| 4,584,106 * | 4/1986 | Held ....................................... 210/169 |
| 4,691,732 * | 9/1987 | Johnson et al. ....................... 137/268 |
| 4,780,197 | 10/1988 | Schuman . |
| 5,573,666 * | 11/1996 | Korin .................................... 210/443 |
| 5,580,448 | 12/1996 | Brandreth, III . |
| 5,827,434 * | 10/1998 | Yando .................................... 210/205 |
| 5,843,309 * | 12/1998 | Mancil .................................... 210/205 |
| 5,897,770 * | 4/1999 | Hatch et al. .......................... 210/206 |
| 5,976,385 * | 11/1999 | King ...................................... 210/169 |
| 6,004,458 * | 12/1999 | Davidson ............................... 210/206 |

* cited by examiner

*Primary Examiner*—David A. Simmons
*Assistant Examiner*—Frank M. Lawrence
(74) *Attorney, Agent, or Firm*—Thomas C. Saitta

(57) ABSTRACT

A device for delivering chemical solutions into a liquid flow within a chemical dispensing unit, where said chemical solution is created by dissolving solid chemical contained within a chemical cartridge, the unit having a base member and housing connected into a fluid flow line such that liquid flows into the base member, into the housing and back out through the base member or through the top of the housing, the chemical dispenser device having an upper conduit member, an apertured midsection, a chemical containing lower cartridge and a coaxial tube extending through the cartridge, the cartridge having an intake aperture located on the upper portion of its side wall and a dispensing aperture on its top, such that a saturated chemical solution is formed in said cartridge and passes into the liquid flow through the dispensing aperture due to the pressure differential of the liquid flowing into the apertured midsection and out through either the upper conduit or through the coaxial conduit.

13 Claims, 4 Drawing Sheets

CHEMICAL DISPENSER

BACKGROUND OF THE INVENTION

This invention relates generally to the field of dispenser devices used to introduce into a flowing liquid small quantities of a chemical solution created by dissolving a solid or granular chemical. More particularly, the invention relates to such devices to be used as a component in assemblies of the type commonly used for filtration of water in circulation or supply systems, where the rate of introduction of the dissolved chemical into the water is controlled in a manner related to the flow volume of the water stream to insure proper concentration percentage. Even more particularly, the invention relates to replaceable dispensing means which comprise a cartridge which contains the solid chemical and are retained within a housing, where the dispensing means may be utilized with top or bottom exit housings.

It is desirable or necessary in many water supply or recirculation systems, such as water for household or industrial use, or water for use in spas and pools, to add certain chemicals to the water to control bacteria or fungal growth, corrosion, scale deposits, etc. Commonly known additives include chlorine, polyphosphate or sodium silicate. Such additives are typically supplied in solid or granular form for ease of handling, and must therefore be dissolved in liquid and introduced into the water flow. It is imperative that the chemical additives be supplied in the proper concentration, and it is important that the mechanism for adding the chemical solutions provide for proper rate introduction with little variation in concentration. Many conventional systems fail these criteria, the mechanisms being unable to prevent variations in concentration and introduction rates, especially in circumstances where the water flow is not continuous and varies in pressure.

The most simplistic solid chemical additive mechanisms simply divert all or a portion of the water flow stream through a container holding the solid chemical. The water flowing from the container will include an amount of dissolved chemical. These devices suffer from lack of dispensing control, since the amount of chemical present in the outflow is dependent on the volume of solid chemical in the container. As that volume decreases, the concentration of dissolved chemical in the outflow also decreases. Additionally, this type of system produces a highly concentrated chemical surge when water flow is resumed after being shut off for a period of time. Finally, variation in the water flow rate will not correspondingly alter the dissolving rate of the chemical, producing incorrect concentration amounts in the outflow.

Attempts have been made to develop a mechanism which addresses the problems encountered in correctly metering and controlling the chemical introduction and concentration rates, but known systems are either overly complicated or do not fully solve all the problems set forth above. A complicated mechanism is described in U.S. Pat. No. 4,780,197 to Schuman, which discloses a flow-through chemical dispenser cartridge positioned within the internal core of a filter which requires one or more operational valves to perform effectively. A more simplified approach is shown in U.S. Pat. No. 4,347,224 to Beckert et al. This patent discloses a flow housing which contains an internally mounted chemical cartridge. A small amount of the water flow is diverted into the bottom of the chemical cartridge and the chemical solution is drawn through a small aperture in the top of the cartridge by the pressure differential created by the flow of the bulk of the water passing through the housing. This apparatus provides a simple approach to solving the problems encountered in standard solid chemical systems, but the mechanism is just a variation of the standard system where a portion of the water stream is passed through the solid chemical before being returned to the main flow stream. The distinction in Beckert et al. is that the cartridge containing the solid chemical is mounted internal to a large housing through which all the water flows. The sizing of the cartridge is such to create an annular passage down to the bottom of the chemical cartridge, where the water flows through a plurality of liquid inlet holes, past the chemical and out the liquid outlet hole. In effect, the annular passage is just a substitute for a small bypass conduit as found in many old systems, and the problems associated with variations in concentration and surging would still be present.

A much improved design and construction for a flow-through chemical dispenser is shown in my U.S. Pat. No. 5,580,448, wherein a unique cartridge configuration is used to correctly meter and control the chemical introduction and concentration rates of the dissolved solid chemical into the liquid flow stream. The dispenser unit has an upper base member with inlet and outlet openings, and a depending housing is threaded onto the base. A dispenser means comprising an upper tube, an apertured midsection and a cartridge containing the solid chemical is coaxially mounted within the housing, such that water flows through an annular filter, into flow openings in the apertured midsection above the cartridge and out from the top of the upper tube. While the dispenser unit functions at optimum efficiency, the design of the dispenser means is such that it is useable only in dispenser units having upper outflow openings, unless extra conduits are provided to route the liquid after exit from the cartridge, and this limits its applicability to standard housing designs, many of which have bottom outflow openings.

It is an object of this invention to provide a dispenser mechanism which provides a steady state concentration of dissolved chemical, which introduces the chemical solution into the main water stream in amounts directed related to water flow rate or volume to maintain precise percentages of chemical solution, which does not produce excessive chemical concentration during periods of no water flow, and which does not introduce excessive amounts of dissolved chemical when water flow is resumed. It is an object to provide such a device where the cartridge containing the solid chemical is not a flow through cartridge, such that water is not passed through the solid chemical. It is an object to provide such a device where the chemical cartridge can be used alone or in combination with a hollow core filter. It is an object to provide such a device of universal applicability, where the dispenser means containing the chemical cartridge may be utilized with housings having either upper outflow conduits or lower outflow conduits.

SUMMARY OF THE INVENTION

The invention comprises a dispensing device which is incorporated within a chemical dispenser used to introduce a chemical solution into a flow of liquid, where the chemical solution is created by dissolving a solid chemical contained within a cartridge to create a saturated chemical solution. The flow of liquid draws the chemical solution into the liquid at a steady rate. The chemical dispenser housing and base may be of various configurations.

In one type, the chemical dispenser comprises a flow-through, fixed base member having an inlet opening connected to a water supply conduit, an outlet opening connected to a water outflow conduit, and an annular mounting flange adapted to receive a generally cylindrical, hollow, open top housing beneath the base member. A down flow opening in the fixed base diverts water from the inlet opening into the cylindrical housing, and a centrally located up flow opening in the fixed base receives water from the cylindrical housing and directs it through the outflow opening and into the outflow conduit. In a second type, the chemical dispenser comprises a flow-through, fixed base member having an inlet opening connected to a water supply conduit, an outlet opening connected to a water outflow conduit, and an annular mounting flange adapted to receive a generally cylindrical, hollow, open bottom housing above the base member. An up flow opening in the fixed base diverts water from the inlet opening into the cylindrical housing, and a centrally located down flow opening in the fixed base receives water from the cylindrical housing and directs it through the outflow opening and into the outflow conduit. In a third type, the chemical dispenser comprises a flow-through, fixed base member having an inlet opening connected to a water supply conduit and an annular mounting flange adapted to receive a generally cylindrical, hollow, open bottom housing above the base member. An up flow opening in the fixed base diverts water from the inlet opening into the cylindrical housing, and a centrally located upflow opening in the housing receives water from the cylindrical housing and directs it through an outflow opening and into the outflow conduit.

The cylindrical housings for all three types are adapted to receive a centrally positioned, generally tubular chemical solution dispensing mechanism comprising a lower tube member with an open bottom adapted to either mate with the fixed base around the downflow opening or to simply abut the bottom of the housing, a lower portion chemical cartridge having a bottom, a side wall having one or more relatively small openings into the interior of the cartridge positioned near the top of the side wall, and a top wall having a relatively small opening into the interior of the cartridge, within which is deposited a solid or granular chemical additive, an upper conduit portion having an open bottom and top, the open top being adapted to either mate with the fixed base around the upflow opening or to simply abut the top of the housing, an apertured mid-section having relatively large openings for large volume water flow, and a coaxial conduit having an open upper end and an open lower end, the coaxial conduit extending through the lower portion chemical cartridge and a significant distance into the upper conduit portion. The cylindrical housing may also contain a hollow core filter, typically pleated, which surrounds the dispensing mechanism and abuts the bottom or top of the fixed base and the interior bottom or top of the cylindrical housing such that all water must flow pass through the filter to exit the housing.

Once the dispensing device is installed into the housing and fixed base and water flow is initiated, the pressure differential caused by the large volume flow of water into the apertured mid-section and across the small opening in the top of the chemical cartridge draws a small amount of dissolved chemical solution through the small top opening and into the main water flow stream, which exits upwardly from the upper conduit portion for dispenser types having top outflow openings or which passes down through the coaxial conduit for dispenser types having bottom outflow openings, while simultaneously drawing an equally small amount of water into the upper interior of the chemical cartridge to replace the suctioned chemical solution. Because the chemical cartridge has only relatively small openings in relation to the internal volume of the chemical cartridge, the solution contained within the cartridge portion of the dispensing device becomes chemically saturated within a short time after water is first introduced into the housing. The solution within the chemical cartridge remains saturated even when water flow is occurring, since the amount of water drawn into the small side opening to replace the amount of chemical solution drawn out of the small top opening is proportionately small relative to the total volume of the saturated solution contained within the chemical cartridge. Because the solution in the cartridge is saturated, there will be no change in concentration during periods when no water flow is occurring.

DETAILED DESCRIPTION OF THE INVENTION

The invention will now be described in detail, in conjunction with the drawings, with regard for the best mode and preferred embodiment. The invention is a chemical dispensing means for introducing a chemical solution of predetermined concentration and amount into a flow of liquid, the dispenser being incorporated within an adjoined housing and flow-through fixed base connected to inflow and outflow conduits of a water or other liquid delivery system, such as found in a residential or industrial setting for one-time use or recirculation, such as for a spa or pool. The chemical is presented in a solid or granular form within the chemical dispenser and dissolves to create a solution to be introduced into the water flow stream, the chemical being of any soluble type which imparts beneficial properties to the water, such as prevention of bacterial, fungal, mold or other biological growth, reduction or control of deposits of scaling, etc.

Figure 1:
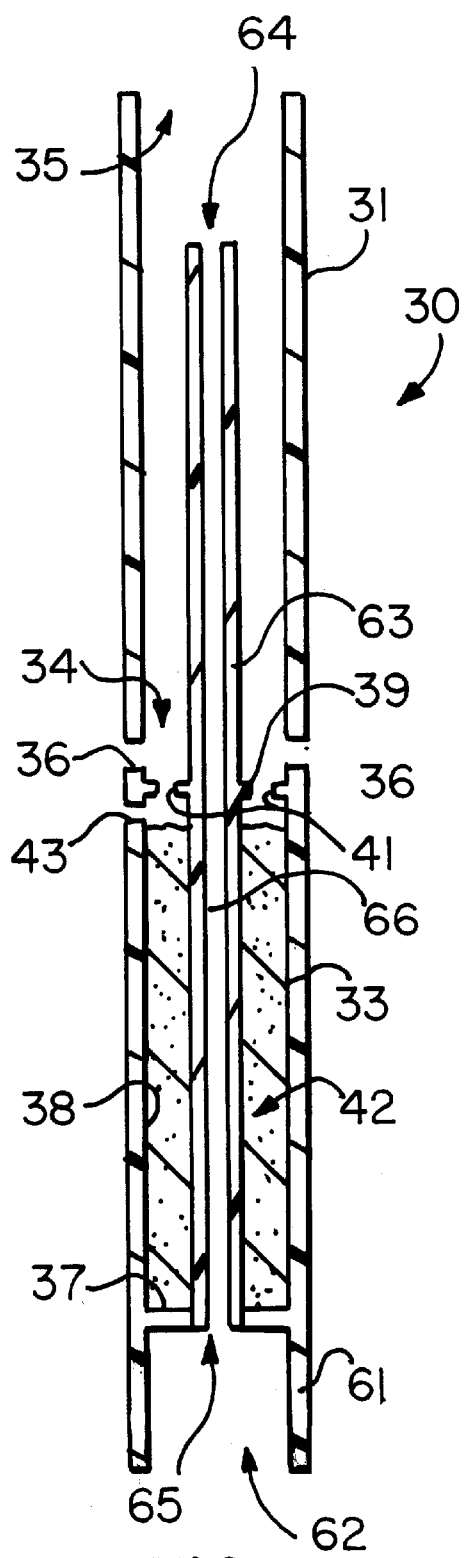
FIG. 1 is a cross-sectional view of the dispensing mechanism.
Figure 2:
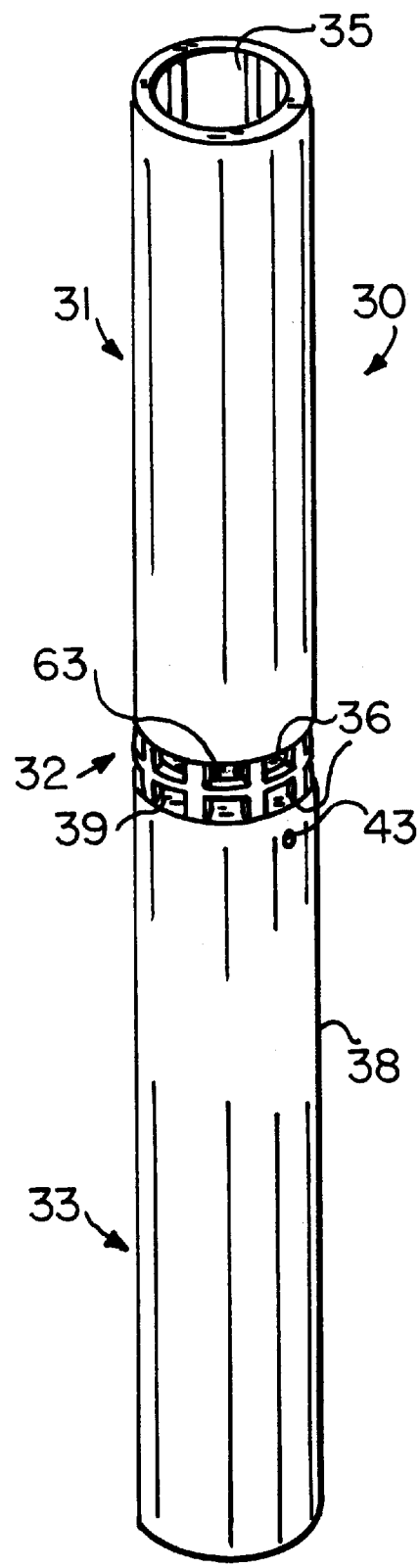
FIG. 2 is a perspective view of the dispensing mechanism.
Figure 3:
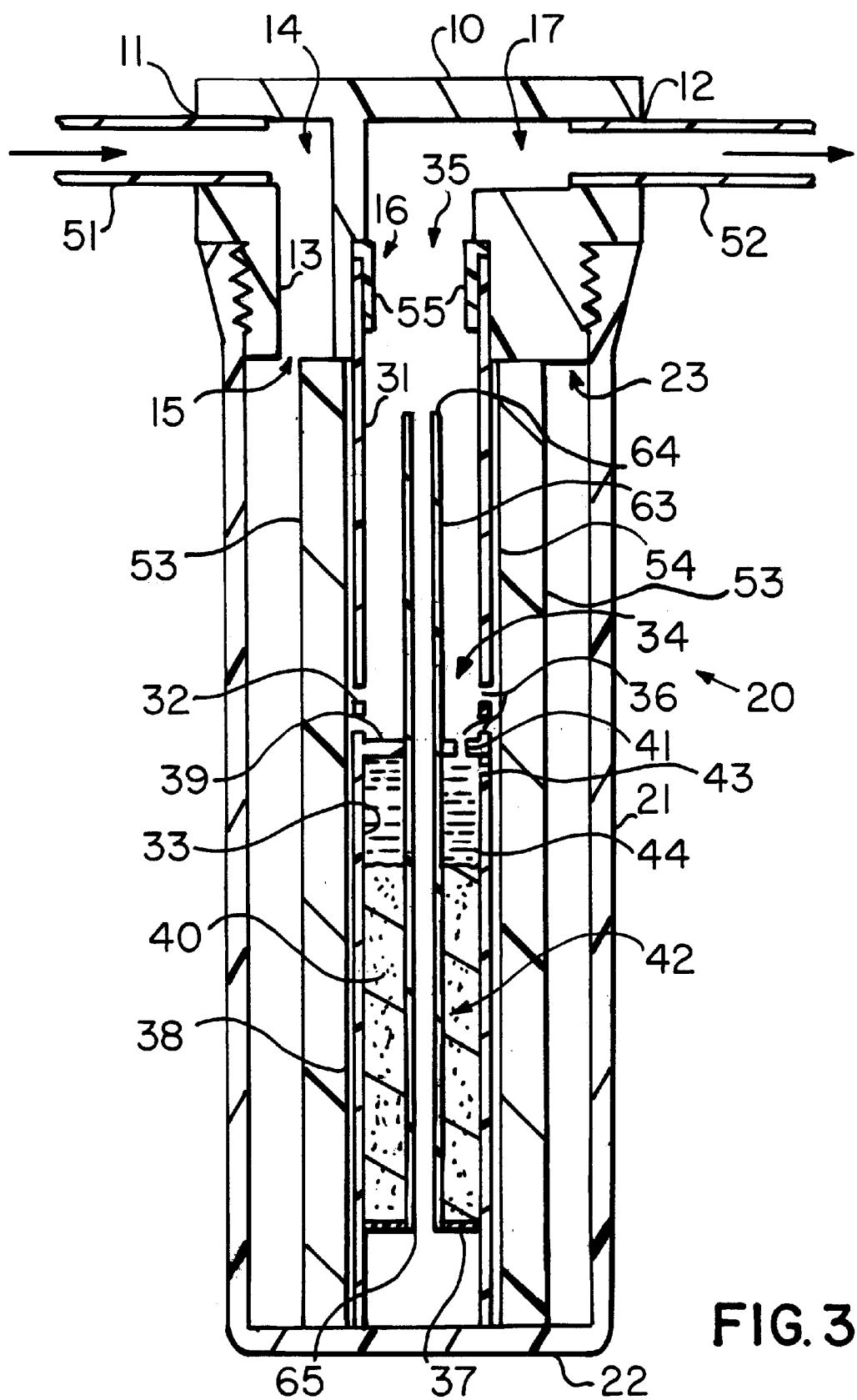
FIG. 3 is a cross-sectional view of the dispensing mechanism mounted within a flow-through filter inside a cylindrical housing and fixed top base member where the housing depends from the base member and the outflow opening is in the base.

FIG. 3 shows a first type of a chemical dispenser unit which is suspended in-line or mounted beneath a support surface, comprising in general a fixed base member 10, a generally cylindrical housing 20 having an open top 23 and adapted to be joined to base member 10, and a chemical dispensing means 30 contained within housing 20. The fixed base member 10 is adapted to be connected in a water flow line, such that base member 10 is provided with an inlet opening 11, typically threaded, to receive the end of an inlet conduit 51 to deliver water or another liquid into the base member 10. Base member 10 is also provided with an outlet opening 12, also typically threaded, to receive the end of an outlet conduit 52, for delivery of the treated water or other liquid for usage. The base member 10 is provided with a depending mating means 13, such as a threaded annular flange, to matingly receive the cylindrical housing 20. The inlet opening 11 connects to an inflow conduit 14 which diverts the water flow downward through a downflow opening 15 beneath the base member 10, the downflow opening 15 being positioned to deliver the water into the interior of the cylindrical housing 20 adjacent the outer wall 21. The housing 20 is a hollow container having an outer wall 21, closed bottom 22 and open top 23, the upper portion of the housing being threaded to mate in a detachable manner with the depending flange mating means 13, the combination of base member 10 and housing 20 forming a closed system whereby the water passes from the downflow opening 15 and can only exit from the housing 20 through a centrally located upflow opening 16, which is connected to the outlet opening 12 of base member 10 by outflow conduit 17.

Figure 4:
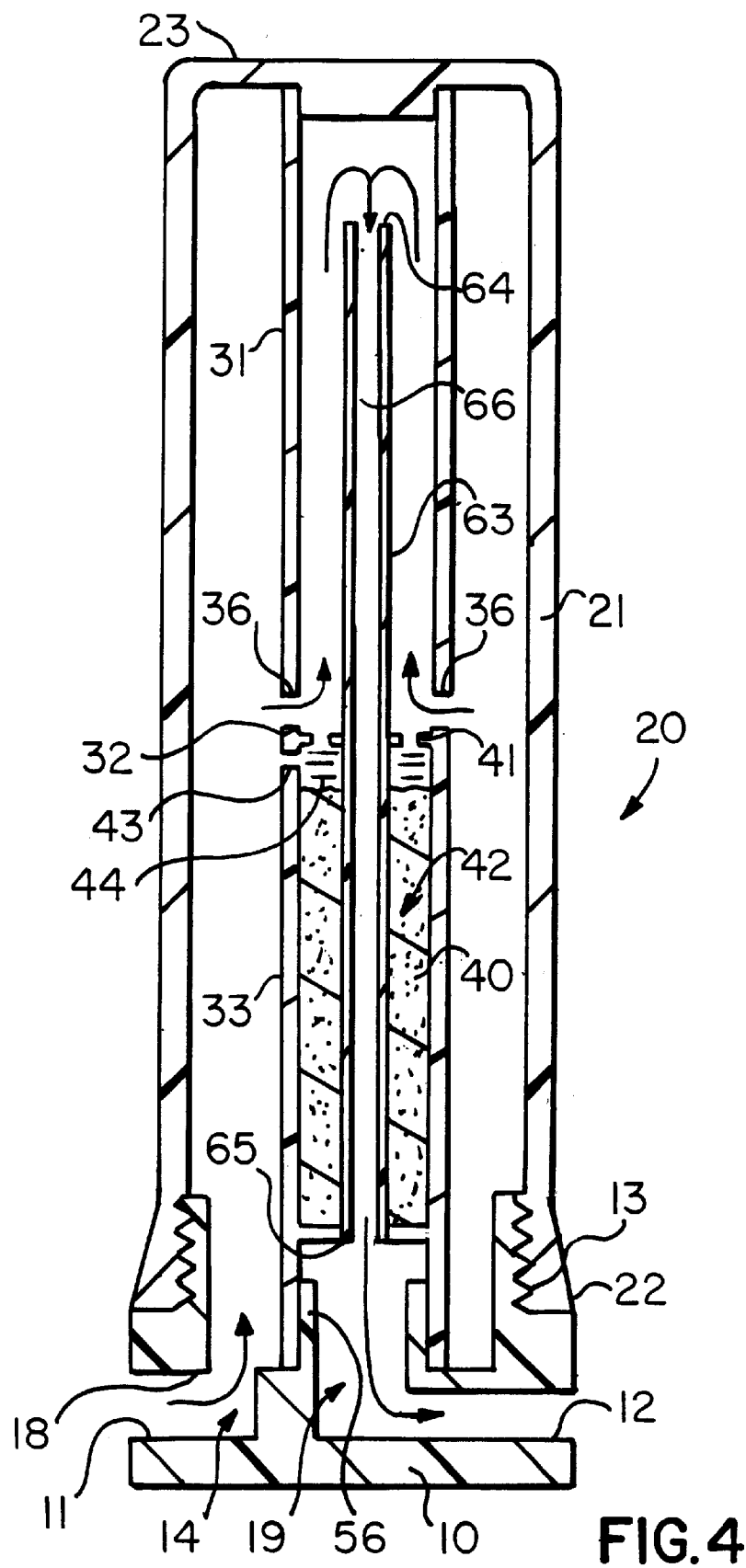
FIG. 4 is a cross-sectional view of the dispensing mechanism mounted within a cylindrical housing and fixed bottom base member where the housing is mounted above the base member and the outflow opening is in the base.

FIG. 4 shows a second type of a chemical dispenser unit which is placed on or attached above a horizontal support surface, comprising in general a fixed base member 10, a generally cylindrical housing 20 adapted to be joined to base member 10, and a chemical dispensing means 30 contained within housing 20. The fixed base member 10 is adapted to be connected in a water flow line, such that base member 10 is provided with an inlet opening 11, typically threaded, to receive the end of an inlet conduit 51 to deliver water or another liquid into the base member 10. Base member 10 is also provided with an outlet opening 12, also typically threaded, to receive the end of an outlet conduit 52, for delivery of the treated water or other liquid for usage. The base member 10 is provided with a mating means 13, such as a threaded annular flange, to matingly receive the cylindrical housing 20. The inlet opening 11 connects to an inflow conduit 14 which diverts the water flow upward through an upflow opening 18 in the base member 10, the upflow opening 18 being positioned to deliver the water into the interior of the cylindrical housing 20 adjacent the outer wall 21. The housing 20 is a hollow container having an outer wall 21, open bottom 22 and closed top 23, the lower portion of the housing being threaded to mate in a detachable manner with the flange mating means 13, the combination of base member 10 and housing 20 forming a closed system whereby the water passes from the upflow opening 18 and can only exit from the housing 20 through a centrally located downflow opening 19, which is connected to the outlet opening 12 of base member 10 by outflow conduit 17.

Figure 5:
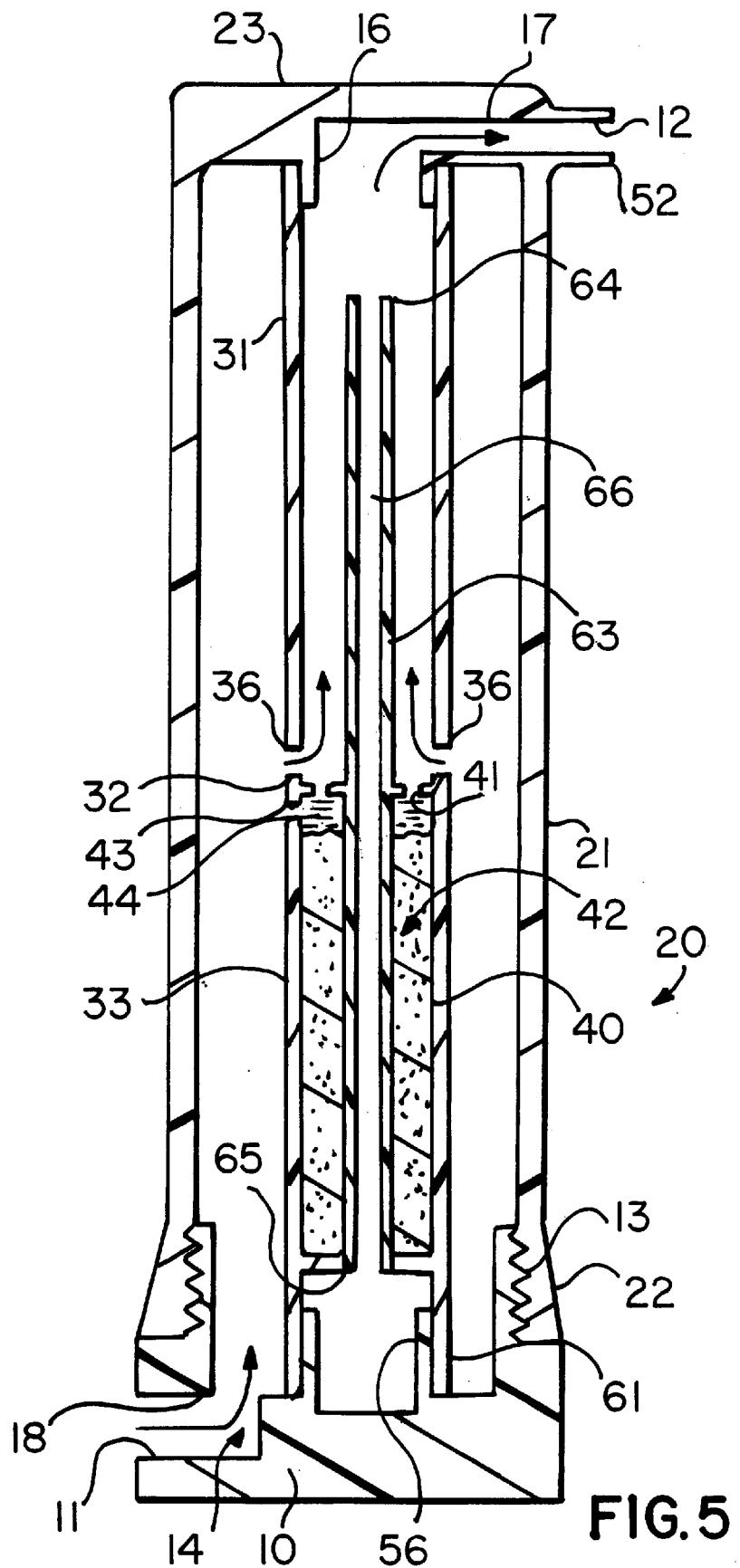
FIG. 5 is a cross-sectional view of the dispensing mechanism mounted within a cylindrical housing and fixed bottom base member where the housing is mounted above the base member and the outflow opening is in the top of the housing.

FIG. 5 shows a third type of a chemical dispenser unit which is placed on or attached above a horizontal support surface, comprising in general a fixed base member 10, a generally cylindrical housing 20 adapted to be joined to base member 10, and a chemical dispensing means 30 contained within housing 20. The fixed base member 10 is adapted to be connected in a water flow line, such that base member 10 is provided with an inlet opening 11, typically threaded, to receive the end of an inlet conduit 51 to deliver water or another liquid into the base member 10. The base member 10 is provided with a mating means 13, such as a threaded annular flange, to matingly receive the cylindrical housing 20. The inlet opening 11 connects to an inflow conduit 14 which diverts the water flow upward through an upflow opening 18 in the base member 10, the upflow opening 18 being positioned to deliver the water into the interior of the cylindrical housing 20 adjacent the outer wall 21. The housing 20 is a hollow container having an outer wall 21, open bottom 22 and closed top 23 with a coaxially located upflow opening 16, outflow conduit 17 and outlet opening 12 connected to an outflow conduit 52 in the closed top 23, the lower portion of the housing 20 being threaded to mate in a detachable manner with the flange mating means 13, the combination of base member 10 and housing 20 forming a closed system whereby the water passes from the upflow opening 18 and can only exit from the housing 20 through the upflow opening 16 and outflow conduit 17 disposed at the top of the housing 20.

Centrally positioned within housing 20 of all three types is chemical dispensing means 30, the chemical dispensing means 30 being constructed such that it properly functions in all three types of dispenser units. Dispensing means 30 is a generally tubular member comprising three main segments, an upper conduit 31, an apertured midsection 32 and a lower chemical containing cartridge member 33. The upper conduit 31 has an open bottom 34 and an open top 35, the open top 35 being adapted to sealingly mate with the underside of the base member 10 around upflow opening 16 when utilized with a base 10 and housing 20 as shown in FIG. 3, or to sealingly abut against the interior of the top 23 of housing 20 as shown in FIG. 4 or against the interior of top 23 around upflow opening 18 as shown in FIG. 5. A gasket member 55 is preferably positioned to improve the seal between the base member 10 and upper conduit 31. The midsection 32 of the dispensing means 30 is comprised of one or more flow openings 36 which allow water to flow into the interior of upper conduit 31 and eventually out of the dispensing means 30. The total area of flow openings 36 should be of sufficient amount so as not to impede flow of water through the device. The dispensing means 30 is of sufficient length to abut the bottom 22 of housing 20 or the base member 10.

The lower portion of the dispensing means 30 connected to and beneath the apertured midsection 32 encompasses the chemical containing cartridge member 33, which comprises a closed bottom member 37, a side wall 38 containing at least one fluid intake refilling aperture 43 and a top member 39 containing at least one dispensing aperture 41. In the preferred embodiment, there is a single intake aperture 43 and a single dispensing aperture 41. Intake aperture 43 is positioned near the top of side wall 38, preferably adjacent the top member 39. The combination of bottom member 37, side wall 38 and top member 39 form a hollow interior 42 to receive the solid or granular chemical substance 40 to be dissolved. Intake aperture 43 is the only means for water to enter the interior 42 of chemical cartridge 33 and dispensing aperture 41 is the only means for the chemical solution 44 to exit the interior 42 of chemical cartridge 33. Dispensing aperture 41 and intake aperture 43 are sized relatively small in comparison to the interior volume of cartridge 33 and in comparison to the total area of flow openings 36 in the midsection portion 32. For example, in a dispensing means 30 having an internal diameter of approximately 1 and $\frac{1}{8}$ inches and a cartridge height of approximately 4 and $\frac{3}{4}$ inches, the dispensing aperture 41 in top wall 39 and the intake aperture 43 in the side wall 38 should be between approximately $\frac{1}{32}$ and $\frac{3}{16}$ inches in diameter, and preferably about $\frac{1}{16}$ inches in diameter. Where multiple dispensing apertures 41 or intake apertures 43 are present, the combined total size of the openings should be in the same range. The size of the intake aperture 43 should be generally equal to the size of the dispensing aperture 41. The size of the intake aperture 43 and dispensing aperture 41 determine the feed rate, and can be varied in relation to the solubility characteristics or desirable concentrations of particular solid chemicals 40 needed for a given application.

A lower tube member 61 having an open bottom 62 extends downward from the cartridge member 33. With the base 10 structures shown in FIGS. 4 and 5, lower tube member 61 mates with the annular mating seat 56 in a sealing manner such that no liquid may pass through the juncture of lower tube member 61 and annular mating seat 56. In the design of FIG. 4, this allows liquid flow though downflow opening 19 and outflow conduit 52. In the design of FIGS. 3 or 5, there is no passage for liquid flow through the mating seat 56 or around the housing bottom 22.

A coaxial conduit or tube member 63 extends completely through the cartridge member 33 and upward into the upper conduit 31, such that the open upper end 64 of the coaxial conduit 63 is disposed a distance above the apertured midsection 32 and the open lower end 65 of the coaxial conduit 63 is disposed at or within the lower tube member 61. Thus coaxial conduit 63 defines a bore passageway 66 completely through the cartridge member 33 such that liquid may flow out the bottom of the dispensing means 30, as shown in FIG. 4. By disposing the open upper end 64 of the coaxial conduit 63 above the apertured midsection 32, proper mixing of the saturated chemical solution 44 in the main liquid flow is assured before the liquid passes down through the coaxial conduit 63.

In the most preferred embodiment, a filter means 53 of known configuration and type having a cylindrical hollow core 54 is also incorporated as part of the complete mechanism. The filter means 53 typically comprises a pleated membrane which abuts the bottom 22 of housing 20 and the bottom of base member 10, such that all water must pass through the filter means 53 before exiting the device. The chemical dispensing means 30 is positioned coaxially within the core 54, such that it is surrounded by filter means 53.

Once the invention is installed in the water flow line and water flow is initiated for the first time, the water flows through downflow opening 15 or upflow opening 18 into the interior of housing 20. The housing 20 and base 10 forming a closed system, the water passes through filter means 53, if present and contacts dispensing means 30. The only available passage is through the flow openings 36 of apertured midsection. As water flows into the interior of midsection 32, a small amount of water enters the intake aperture 43 in the upper portion of side wall 38 of chemical cartridge 33 and fills the upper portion of the interior 42 of the cartridge 33, dissolving a portion of the solid or granular chemical 40 contained therein. After a short period of time, the percentage of chemical 40 dissolved in the water reaches its maximum saturated value, whereby no further dissolving can occur. At this point, the concentration percentage of the solution 44 becomes steady state. As water continues to flow into housing 20, the water flows up through upper conduit 31 into upflow opening 16, then through outflow conduit 17 through outlet opening 12 and into outflow conduit 52, as shown in FIGS. 3 and 5, or water flows from the upper conduit 31 into coaxial conduit 63 and down through the bore passageway 66 and the downflow opening 19 and past outlet opening 12, as shown in FIG. 4. No flow occurs through the coaxial conduit 63 in the designs of FIGS. 3 and 5. The relatively large volume of water flow adjacent the dispensing aperture 41 results in a pressure differential which draws a small amount of the saturated chemical solution 44 from within the cartridge 33. This chemical solution 44 is then mixed in the turbulent flow such that water flowing from the device is treated as desired.

The amount of saturated chemical solution 44 drawn through the dispensing aperture 41 is a function of aperture size, which is predetermined, and water flow rate. As water flow rate increases the pressure differential is increased and more solution 44 is drawn out and, conversely, as water flow rate decreases the pressure differential decreases and less solution 44 is drawn out. This insures that the proper amount of saturated chemical solution 44 is introduced into the water flow no matter what flow rate is present. In addition, since the amount of saturated solution 44 drawn from the chemical cartridge 33 is relatively small in comparison to the total volume of saturated solution 44, and since the water drawn into the interior 42 through intake aperture 43 is likewise of small amount relative to the total volume of the saturated chemical solution 44, the solution 44 within the cartridge 33 remains in a constant, fully saturated condition. The chemical solution 44 remains at the same concentration within the cartridge 33 no matter what amount of solid chemical 40 is present in the cartridge 33, since the chemical solution 44 is always at a saturated level. Because the refilling aperture 43 is located in the upper portion of side wall 38, the replacement water flows into the dissolved chemical solution 44 rather than into the solid or granular chemical 40, so no surging or super-saturation can occur from flow or turbulence effects within the cartridge 33. In systems which use a flow through mechanism for dissolving the chemical and do not provide for a saturated solution, the solution added to the water when the system is restarted after a stoppage period is excessively high in concentration, since the water remaining in contact with the solid chemical during the stoppage becomes saturated.

The invention can be constructed as a complete unit including base member 10, housing 20 and dispensing means 30, which is then incorporated into a water delivery system, or the dispensing means 30 can be retrofitted into existing base member 10 and housing 20 combinations.

It is contemplated that equivalents and substitutions may be apparent to those skilled in the art, and the true scope and definition of the invention therefore is to be as set forth in the following claims.

I claim:

1. A chemical dispenser for use in a liquid flow conduit line comprising a base member adapted to be incorporated into said flow conduit line, said base member having an inlet opening adapted to receive an inlet conduit, an outlet opening adapted to receive an outlet conduit, a downflow opening communicating with said inlet opening, a centrally located upflow opening communicating with said outlet opening, and mating means adapted to receive a cylindrical housing, said cylindrical housing comprising an outer wall, closed bottom and open top, and adapted to mate with said mating means of said base member;

said chemical dispenser comprising an upper conduit segment connected to an apertured midsection segment connected to a lower chemical containing cartridge member connected to a lower tube member;

a coaxial conduit extending from within said upper conduit segment through said midsection segment and said cartridge member to said lower tube member;

said upper conduit segment comprising an open top and an open bottom, said open top adapted to sealingly mate with said upflow opening of said base member;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form, whereby liquid enters said cartridge member through said intake aperture and contacts said chemical to dissolve said chemical and form a saturated chemical solution within said cartridge interior, and whereby said saturated solution exits said cartridge member through said dispensing aperture in response to liquid flow through said apertured midsection and upper tube segment; and said lower tube member adapted to sealingly abut said closed bottom of said housing.

2. The device of claim 1, where the size of said intake aperture and said dispensing aperture are small relative to the size of said at least one flow opening in said apertured midsection.

3. The device of claim 2, where said intake aperture and said dispensing aperture are between 1/32 and 3/16 inches in diameter.

4. The device of claim 1, further comprising filter means positioned within said housing and surrounding said chemical dispensing means.

5. The device of claim 4, where said filter means comprises a pleated filter having a cylindrical hollow core.

6. The device of claim 1, further comprising a gasket member positioned between said upper conduit and said base member.

7. The device of claim 1, where said intake aperture in said side wall is positioned adjacent said top wall.

8. A chemical dispenser for use in a liquid flow conduit line comprising a base member adapted to be incorporated into said flow conduit line, said base member having an inlet opening adapted to receive an inlet conduit, an outlet opening adapted to receive an outlet conduit, an upflow opening communicating with said inlet opening, a centrally located downflow opening communicating with said outlet opening, and mating means adapted to receive a cylindrical housing, said cylindrical housing comprising an outer wall, open bottom and closed top, and adapted to mate with said mating means of said base member;

said chemical dispenser comprising an upper conduit segment connected to an apertured midsection segment connected to a lower chemical containing cartridge member connected to a lower tube member;

a coaxial conduit extending from within said upper conduit segment through said midsection segment and said cartridge member to said lower tube member;

said upper conduit segment comprising an open top and an open bottom, said open top adapted to sealingly mate with said closed top of said housing;

said apertured midsection segment having at least one flow opening to allow liquid to flow into said upper conduit segment;

said cartridge member comprising a closed bottom, a side wall containing at least one intake aperture positioned in the upper portion of said side wall, and a top containing at least one dispensing aperture, said bottom, top and side wall defining an interior and containing a chemical in solid form, whereby liquid enters said cartridge member through said intake aperture and contacts said chemical to dissolve said chemical and form a saturated chemical solution within said cartridge interior, and whereby said saturated solution exits said cartridge member through said dispensing aperture in response to liquid flow through said apertured midsection and upper tube segment; and said lower tube member adapted to sealingly mate with said downflow opening of said base member.

9. The device of claim 8, where the size of said intake aperture and said dispensing aperture are small relative to the size of said at least one flow opening in said apertured midsection.

10. The device of claim 9, where said intake aperture and said dispensing aperture are between 1/32 and 3/16 inches in diameter.

11. The device of claim 8, further comprising filter means positioned within said housing and surrounding said chemical dispensing means.

12. The device of claim 11, where said filter means comprises a pleated filter having a cylindrical hollow core.

13. The device of claim 8, where said intake aperture in said side wall is positioned adjacent said top wall.

\* \* \* \* \*